United States Patent
Miyamoto et al.

(10) Patent No.: US 9,169,577 B2
(45) Date of Patent: Oct. 27, 2015

(54) SURFACE-TREATED STEEL SHEET, METHOD FOR MANUFACTURING THE SAME, AND RESIN-COVERED STEEL SHEET USING THE SAME

(75) Inventors: Yuka Miyamoto, Kawasaki (JP); Takeshi Suzuki, Chiba (JP); Norihiko Nakamura, Chiyoda-ku (JP); Yoichi Tobiyama, Chiba (JP)

(73) Assignee: JFE Steel Corporation, Tokyo (JP)

( * ) Notice: Subject to any disclaimer, the term of this patent is extended or adjusted under 35 U.S.C. 154(b) by 96 days.

(21) Appl. No.: 13/819,936

(22) PCT Filed: Sep. 14, 2011

(86) PCT No.: PCT/JP2011/005165
§ 371 (c)(1),
(2), (4) Date: May 13, 2013

(87) PCT Pub. No.: WO2012/035765
PCT Pub. Date: Mar. 22, 2012

(65) Prior Publication Data
US 2013/0224517 A1    Aug. 29, 2013

(30) Foreign Application Priority Data
Sep. 15, 2010 (JP) ................. 2010-206514

(51) Int. Cl.
*C25D 9/10* (2006.01)
*C23C 28/00* (2006.01)
*C23C 28/02* (2006.01)
*B32B 15/01* (2006.01)
*C22C 38/00* (2006.01)
*C25D 5/18* (2006.01)
*C21D 8/02* (2006.01)

(52) U.S. Cl.
CPC ............. *C25D 9/10* (2013.01); *B32B 15/011* (2013.01); *B32B 15/013* (2013.01); *B32B 15/015* (2013.01); *C21D 8/0278* (2013.01); *C22C 38/00* (2013.01); *C23C 28/00* (2013.01); *C23C 28/021* (2013.01); *C23C 28/023* (2013.01); *C25D 5/18* (2013.01); *Y10T 428/12972* (2015.01)

(58) Field of Classification Search
CPC .................................. C25D 9/10; C25D 5/18
USPC .......................................... 205/106, 316, 318
See application file for complete search history.

(56) References Cited

U.S. PATENT DOCUMENTS

2005/0175798 A1* 8/2005 Kurokawa et al. ........... 428/34.1
2010/0270164 A1* 10/2010 Kubota ......................... 205/50
2011/0259756 A1* 10/2011 Hirano et al. ................ 205/320

FOREIGN PATENT DOCUMENTS

| JP | 04-107285 A | 4/1992 |
|---|---|---|
| JP | 2009-120919 A | 6/2009 |
| JP | 2009-155665 A | 7/2009 |
| JP | 2009-256726 A | 11/2009 |
| JP | 2010-013728 A | 1/2010 |

OTHER PUBLICATIONS

Machine Translation, Tachiki et al., JP 2009-120919, Jun. 2009.*
International Search Report dated Nov. 22, 2011, application No. PCT/JP2011/005165.
Chinese Office Action dated Mar. 26, 2014, application No. 2011800443199.

* cited by examiner

*Primary Examiner* — Bryan D. Ripa
(74) *Attorney, Agent, or Firm* — RatnerPrestia

(57) ABSTRACT

Provided are a Cr-free surface-treated steel sheet that has excellent humid resin adhesion and corrosion resistance and that exhibits no streak-like surface defects, a method for manufacturing such a surface-treated steel sheet, and a resin-covered steel sheet using such a surface-treated steel sheet. A surface-treated steel sheet includes a steel sheet; a corrosion-resistant coating, on at least one side thereof, that is composed of at least one layer selected from a Ni layer, a Sn layer, an Fe—Ni alloy layer, an Fe—Sn alloy layer, and an Fe—Ni—Sn alloy layer; and an adherent coating, on the corrosion-resistant coating, that contains Zr and at least one species selected from P derived from a phosphoric acid and C derived from a phenolic resin in a total mass ratio to Zr of 0.01 to 10.

2 Claims, 1 Drawing Sheet

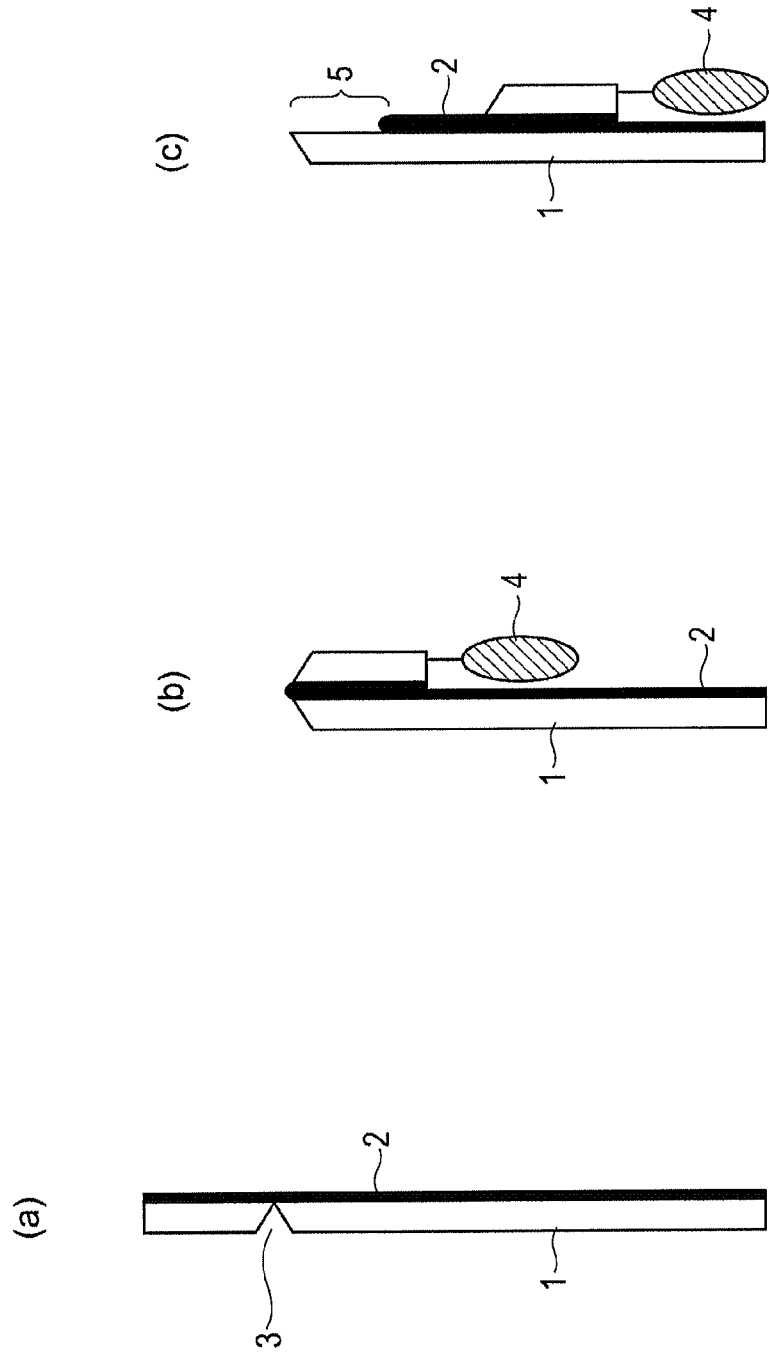

SURFACE-TREATED STEEL SHEET, METHOD FOR MANUFACTURING THE SAME, AND RESIN-COVERED STEEL SHEET USING THE SAME

CROSS REFERENCE TO RELATED APPLICATIONS

This is the U.S. National Phase application of PCT International Application No. PCT/JP2011/005165, filed Sep. 14, 2011, and claims priority to Japanese Patent Application No. 2010-206514, filed Sep. 15, 2010, the disclosures of each application being incorporated herein by reference in their entireties for all purposes.

FIELD OF THE INVENTION

The present invention relates to surface-treated steel sheets used mainly for containers such as cans after covering the surface thereof with a resin by laminating, for example, a resin film or by applying a coating containing a resin, and particularly to surface-treated steel sheets that provide excellent adhesion to a resin covering in a hot, humid environment (hereinafter referred to as humid resin adhesion) and that maintain excellent corrosion resistance after the resin covering comes off, methods for manufacturing such surface-treated steel sheets, and resin-covered steel sheets manufactured by covering such surface-treated steel sheets with a resin.

BACKGROUND OF THE INVENTION

Metal sheets such as tinned steel sheets and electrolytically chromate-treated steel sheets, which are called tin-free steel sheets, have been used for various metal cans such as beverage cans, food cans, pails, and 18 L cans. Among others, tin-free steel sheets, which are manufactured by electrolytic treatment of steel sheets in a plating bath containing hexavalent Cr, have the advantage of excellent humid resin adhesion to a resin such as a coating.

Recently, the growing environmental awareness has resulted in regulations on the use of hexavalent Cr worldwide, and there is a need for an alternative to tin-free steel sheets, which are manufactured using a plating bath containing hexavalent Cr.

In conventional metal can manufacturing, metal sheets such as tin-free steel sheets are coated and formed into cans. Recently, however, resin-covered metal sheets, which are covered with a resin such as a plastic film, rather than coated, have increasingly been used in can forming for reduced waste during manufacture. Such resin-covered metal sheets require the resin to adhere strongly to the metal sheets. In particular, resin-covered metal sheets used for beverage cans and food cans, which may undergo a retort sterilization process after being filled with the contents thereof, require sufficient humid resin adhesion for the resin not to peel off in a hot, humid environment and sufficient corrosion resistance not to be corroded and perforated by, for example, the contents of the cans after the resin comes off partially due to, for example, scratching.

To meet such a need, the inventors have recently disclosed in patent document 1 that a Cr-free surface-treated steel sheet with significantly excellent humid resin adhesion and excellent corrosion resistance can be manufactured by forming a corrosion-resistant coating composed of at least one layer selected from a Ni layer, a Sn layer, an Fe—Ni alloy layer, an Fe—Sn alloy layer, and an Fe—Ni—Sn alloy layer on at least one side of a steel sheet and then forming an adherent coating by cathode electrolytic treatment in an aqueous solution containing an ion having Ti and an ion having at least one metallic element selected from Co, Fe, Ni, V, Cu, Mn, and Zn.

Patent Document

Patent document 1: Japanese Unexamined Patent Application Publication No. 2009-155665

SUMMARY OF THE INVENTION

The surface-treated steel sheet manufactured by the method disclosed in patent document 1 may exhibit streak-like surface defects.

The present invention aims to provide a Cr-free surface-treated steel sheet that has excellent humid resin adhesion and corrosion resistance and that exhibits no streak-like surface defects, a method for manufacturing such a surface-treated steel sheet, and a resin-covered steel sheet using such a surface-treated steel sheet.

After a considerable study, the inventors have discovered that it is effective to form the adherent coating in patent document 1 by cathode electrolytic treatment in an aqueous solution containing Zr, rather than Ti, and at least one species selected from phosphoric acids and phenolic resins.

Based on these findings, the present invention provides a surface-treated steel sheet including a steel sheet; a corrosion-resistant coating, on at least one side thereof, that is composed of at least one layer selected from a Ni layer, a Sn layer, an Fe—Ni alloy layer, an Fe—Sn alloy layer, and an Fe—Ni—Sn alloy layer; and an adherent coating, on the corrosion-resistant coating, that contains Zr and at least one species selected from P derived from a phosphoric acid and C derived from a phenolic resin in a total mass ratio to Zr of 0.01 to 10. Preferably, the coating mass of Zr of the adherent coating is 3 to 200 mg/m$^2$ per side.

The surface-treated steel sheet of the present invention can be manufactured by forming a corrosion-resistant coating composed of at least one layer selected from a Ni layer, a Sn layer, an Fe—Ni alloy layer, an Fe—Sn alloy layer, and an Fe—Ni—Sn alloy layer on at least one side of a steel sheet; and then forming an adherent coating by cathode electrolytic treatment in an aqueous solution containing Zr in a concentration of 0.008 to 0.07 mol/L (L: liter) and at least one species selected from phosphoric acids and phenolic resins in a total molar ratio to Zr of 0.01 to 10.

The surface-treated steel sheet of the present invention can also be manufactured by forming a corrosion-resistant coating composed of at least one layer selected from a Ni layer, a Sn layer, an Fe—Ni alloy layer, an Fe—Sn alloy layer, and an Fe—Ni—Sn alloy layer on at least one side of a steel sheet; and then forming an adherent coating by cathode electrolytic treatment in an aqueous solution containing Zr in a concentration of 0.008 to 0.07 mol/L and at least one species selected from phosphoric acids and phenolic resins in a total molar ratio to Zr of 0.01 to 10 under electrolysis conditions where a current is used that varies between a current density at which Zr precipitates and a current density at which no Zr precipitates at a period of 0.01 to 0.4 second and that remains within a current density range where no Zr precipitates for 0.005 to 0.2 second per period, and the number of cycles is 10 or more. The upper limit of the current density range where no Zr precipitates depends on the composition and pH of the aqueous solution used for the cathode electrolytic treatment. This method may use a current alternating between a current density at which Zr precipitates and a current density at which no Zr precipitates. Preferably, the current density at which no Zr precipitates is 0 A/dm$^2$.

The present invention also provides a resin-covered steel sheet comprising the surface-treated steel sheet of the present invention and a resin covering the surface-treated steel sheet.

The present invention enables the manufacture of a Cr-free surface-treated steel sheet that has excellent humid resin adhesion and corrosion resistance and that exhibits no streak-like surface defects. The surface-treated steel sheet of the present invention serves as an alternative to conventional tin-free steel sheets without any problem and is applicable to containers for storing, for example, oil, organic solvents, and coatings without being covered with a resin. In addition, when a resin-covered steel sheet manufactured by covering the surface-treated steel sheet with a resin is formed into cans and can lids and is exposed to a retort atmosphere, the resin does not peel off. In addition, the resin-covered steel sheet exhibits little dot corrosion and has extremely excellent corrosion resistance because little Fe elutes from the steel at portions where the resin is missing, such as scratches, and the coverage is good.

BRIEF DESCRIPTION OF THE DRAWINGS

FIG. 1 illustrates a 180° peel test.

DETAILED DESCRIPTION OF EMBODIMENTS OF THE INVENTION

1) Surface-Treated Steel Sheet

A surface-treated steel sheet of an embodiment of the present invention includes a steel sheet; a corrosion-resistant coating, formed on at least one side thereof, that is composed of at least one layer selected from a Ni layer, a Sn layer, an Fe—Ni alloy layer, an Fe—Sn alloy layer, and an Fe—Ni—Sn alloy layer; and an adherent coating, formed on the corrosion-resistant coating, that contains Zr and at least one species selected from P derived from a phosphoric acid and C derived from a phenolic resin.

The steel sheet as material may be a common low-carbon cold-rolled steel sheet for cans.

1.1) Corrosion-Resistant Coating

The corrosion-resistant coating formed on the surface of the steel sheet needs to be a single-layer coating composed of a Ni layer, a Sn layer, an Fe—Ni alloy layer, an Fe—Sn alloy layer, or an Fe—Ni—Sn alloy layer, or a multilayer coating composed thereof, so that it adheres firmly to the underlying steel sheet and maintains excellent corrosion resistance of the steel sheet even if a resin covering the corrosion-resistant coating comes off partially due to, for example, scratching. For a Ni layer, the coating mass of Ni is preferably 200 mg/m$^2$ or more per side of the steel sheet. For an Fe—Ni alloy layer, the coating mass of Ni is preferably 60 mg/m$^2$ or more per side of the steel sheet. For a Sn layer or an Fe—Sn alloy layer, the coating mass of Sn is preferably 100 mg/m$^2$ or more per side of the steel sheet. For an Fe—Ni—Sn alloy layer, the coating mass of Ni is preferably 50 mg/m$^2$ or more per side of the steel sheet, and the coating mass of Sn is preferably 100 mg/m$^2$ or more per side of the steel sheet. The coating masses of Ni and Sn can be measured by X-ray fluorescence surface analysis.

The corrosion-resistant coating can be formed in a known manner depending on the metallic elements contained therein.

1.2) Adherent Coating

Forming an adherent coating containing Zr and at least one species selected from P derived from a phosphoric acid and C derived from a phenolic resin in a total mass ratio to Zr of 0.01 to 10, preferably 0.05 to 3, on the corrosion-resistant coating provides excellent humid resin adhesion, thereby reliably avoiding streak-like surface defects. Although the cause is not fully understood at present, it is believed that such elements are incorporated into the coating containing Zr to form a dense coating with uniformly distributed surface irregularities. It is also believed that hydroxyl groups present in the adherent coating and hydroxyl groups of the phenolic resin or hydroxyl groups of the phosphoric acid are crosslinked through dehydration condensation with hydroxyl groups present on the surface of the corrosion-resistant coating, thereby covalently bonding the adherent coating and the corrosion-resistant coating with oxygen atoms therebetween.

The coating mass of Zr of the adherent coating is preferably 3 to 200 mg/m$^2$ per side of the steel sheet. A coating mass of Zr of 3 to 200 mg/m$^2$ is sufficient to be effective in improving the humid resin adhesion and avoiding streak-like surface defects, whereas a coating mass of Zr above 200 mg/m$^2$ provides no greater effect and results in increased cost. More preferably, the coating mass of Zr is 8 to 100 mg/m$^2$. The coating mass of Zr can be controlled depending on the Zr concentration, electric charge, and pH of the bath.

The coating mass of P of the adherent coating is preferably 0.1 to 50 mg/m$^2$ per side of the steel sheet. The coating mass of C is preferably 0.1 to 50 mg/m$^2$ per side of the steel sheet. A coating mass of P or C of 0.1 to 50 mg/m$^2$ allows formation of a coating with excellent humid resin adhesion and corrosion resistance and without streak-like surface defects.

The adherent coating preferably further contains O. A coating containing O is composed mainly of Zr oxide, which is more effective in improving the humid resin adhesion and avoiding streak-like surface defects.

The coating masses of Zr and P of the adherent coating can be measured by X-ray fluorescence surface analysis. The coating mass of C of the adherent coating can be measured by subtracting the C content of the steel sheet, as the background, from the total C content measured by gas chromatography. Although the O content is not specified, it can be identified by surface analysis using an X-ray photoelectron spectrometer (XPS).

The adherent coating can be formed by cathode electrolytic treatment in an aqueous solution containing Zr in a concentration of 0.008 to 0.07 mol/L, preferably 0.02 to 0.05 mol/L, and at least one species selected from phosphoric acids and phenolic resins in a total molar ratio to Zr of 0.01 to 10, preferably 0.05 to 5. A Zr concentration below 0.008 mol/L does not allow formation of a coating with excellent humid resin adhesion and without streak-like surface defects. A Zr concentration above 0.07 mol/L causes a problem in that Zr is no longer stable in the aqueous solution and forms Zr oxide. A total molar ratio of at least one species selected from phosphoric acids and phenolic resins to Zr below 0.01 does not allow formation of a coating with excellent humid resin adhesion and without streak-like surface defects. A total molar ratio above 10 results in decreased adhesion because of insufficient crosslinking between the Zr coating and the hydrated phosphoric acid or phenolic resin, as well as providing no greater effect and resulting in increased cost.

The Zr-containing aqueous solution is preferably an aqueous solution containing a fluorozirconate ion or an aqueous solution containing a fluorozirconate ion and a fluoride salt. Examples of compounds that give a fluorozirconate ion include hydrofluorozirconic acid, ammonium hexafluorozirconate, and potassium hexafluorozirconate. Examples of fluoride salts include sodium fluoride, potassium fluoride, silver fluoride, and tin fluoride. In particular, an aqueous solution containing potassium hexafluorozirconate and an aqueous solution containing potassium hexafluorozirconate and sodium fluoride are preferred because they allow efficient formation of a homogeneous coating.

Examples of compounds that give a phosphoric acid include orthophosphoric acid and phosphates of simultaneously added metal ions, such as nickel phosphate, iron phosphate, cobalt phosphate, and zirconium phosphate.

The phenolic resin preferably has a weight average molecular weight of about 3,000 to about 20,000, more preferably about 5,000. The phenolic resin may be made water-soluble by modifying the phenolic resin with an aminoalcohol. Optionally, tannic acid is added to the phenolic resin. When added, tannic acid reacts with iron (Fe) in an Fe—Ni alloy layer, an Fe—Sn layer, or an Fe—Ni—Sn alloy layer during the above treatment to form an iron tannate coating on the surface of the corrosion-resistant coating. This iron tannate coating is effective in improving the humid adhesion.

Furthermore, intermittent growth of the coating by cathode electrolytic treatment using a current varying periodically between a current density at which Zr precipitates and a current density at which no Zr precipitates provides a higher humid resin adhesion than continuous electrolysis using a constant current. This requires a certain coating mass of Zr to be ensured. To ensure the required coating mass of Zr with commercially practical productivity (line speed), cathode electrolytic treatment is preferably performed under electrolysis conditions where a current is used that has a period of 0.01 to 0.4 second and that remains within a current density range where no Zr precipitates for 0.005 to 0.2 second per period, and the number of cycles is 10 or more. It is considered that electrolytic treatment under such conditions promotes redissolution of precipitated Zr, rather than does not cause Zr to precipitate, in the current density range where no Zr precipitates, which will result in formation of a denser coating with more uniformly distributed surface irregularities, thus providing excellent humid resin adhesion.

The upper limit of the current density range where no Zr precipitates, i.e., the current density at the boundary between the range where no Zr precipitates and the range where Zr precipitates, depends on the composition and pH of the aqueous solution containing Zr and at least one species selected from phosphoric acids and phenolic resins; therefore, the upper limit needs to be determined in advance depending on the aqueous solution to be used.

The current varying periodically between a current density at which Zr precipitates and a current density at which no Zr precipitates can be an alternating current varying periodically, as in a sign curve, or a pulsed current alternating between a current density at which Zr precipitates and a current density at which no Zr precipitates. The current can also be a direct current on which an alternating current or a pulsed current is superimposed. If a pulsed current alternating between a current density at which Zr precipitates and a current density at which no Zr precipitates is used, the current density at which no Zr precipitates is preferably 0 $A/dm^2$, which eliminates the need to determine in advance the upper limit of the current density range where no Zr precipitates depending on the aqueous solution used.

2) Resin-Covered Steel Sheet (Laminated Steel Sheet)

The surface-treated steel sheet of the present invention can be covered with a resin to form a resin-covered steel sheet. This resin-covered steel sheet has excellent corrosion resistance and formability because of the excellent humid resin adhesion of the surface-treated steel sheet of the present invention, as described above.

The resin used for covering the surface-treated steel sheet of the present invention is not limited, and various thermoplastic resins and thermosetting resins can be used. Examples of such resins include olefin resin films such as polyethylene, polypropylene, ethylene-propylene copolymer, ethylene-vinyl acetate copolymer, ethylene-acrylate ester copolymer, and ionomer films; polyester films such as polybutylene terephthalate films; polyamide films such as nylon 6, nylon 6,6, nylon 11, and nylon 12 films; and unstretched or biaxially stretched thermoplastic resin films such as polyvinyl chloride and polyvinylidene chloride films. If the resin is laminated using an adhesive, the adhesive is preferably a urethane adhesive, epoxy adhesive, acid-modified olefin resin adhesive, copolyamide adhesive, copolyester adhesive (thickness: 0.1 to 5.0 µl) or the like. Alternatively, the surface-treated steel sheet or the film may be coated with a thermosetting coating to a thickness of 0.05 to 2 µm for use as an adhesive.

Furthermore, various thermoplastic and thermosetting coatings can be used alone or in a combination of two or more, including modified epoxy coatings such as phenolic epoxies and amino-epoxies; vinyl chloride-vinyl acetate copolymers, saponified vinyl chloride-vinyl acetate copolymers, vinyl chloride-vinyl acetate-maleic anhydride copolymers, epoxy-modified, epoxyamino-modified, and epoxyphenol-modified vinyl coatings or modified vinyl coatings; acrylic coatings; synthetic rubber coatings such as styrene-butadiene copolymers, and the like.

The resin covering layer preferably has a thickness in the range of 3 to 50 µm, in particular 5 to 40 µm. A thickness below the above range results in insufficient corrosion resistance, whereas a thickness above the above range tends to cause a problem with formability.

The resin covering layer can be formed on the surface-treated steel sheet by any technique. For example, the resin covering layer can be formed by extrusion coating, thermal bonding of a cast film, thermal bonding of a biaxially stretched film, or the like. For extrusion coating, the resin-covered steel sheet can be manufactured by extruding and applying a melted resin onto the surface-treated steel sheet and thermally bonding them together. Specifically, the resin is melted and kneaded in an extruder and is extruded into a thin film through a T-die, and the extruded melted resin film is pressed against and integrated with the surface-treated steel sheet by passing it through a pair of laminating rollers with cooling and is then quenched. To form a plurality of resin covering layers by extrusion coating, a plurality of extruders are used for the respective layers, and a multiple multilayer die causes the resin flows from the extruders to merge together. The subsequent extrusion coating process may be the same as in the formation of a single resin layer. Resin covering layers can also be formed on both sides of the surface-treated steel sheet by passing it vertically between a pair of laminating rollers while feeding melted resin webs to both sides thereof.

The resin-covered steel sheet thus manufactured is applicable to three-piece cans, which have a side seam, and seamless cans (two-piece cans). The resin-covered steel sheet is also applicable to stay-on-tub easy-to-open can lids and full-open easy-to-open can lids.

The foregoing is merely illustrative of an embodiment of the present invention; various modifications are possible within the scope of the claims.

Example 1

A corrosion-resistant coating was formed on both sides of as-cold-rolled low-carbon steel sheets (0.2 mm thick) used for manufacture of tin-free steel sheets (TFS) using plating baths a and b shown in Table 1 by processes A to D:

A: The cold-rolled steel sheets were annealed at about 700° C. in a 10 vol % $H_2$+90 vol % $N_2$ atmosphere, were temper-rolled at an elongation of 1.5%, were degreased by alkaline electrolysis, were pickled with sulfuric acid, and were coated with Ni in plating bath a to form a corrosion-resistant coating composed of a Ni layer.

B: The cold-rolled steel sheets were degreased by alkaline electrolysis, were coated with Ni in plating bath a, were annealed at about 700° C. in a 10 vol % $H_2$+90 vol % $N_2$ atmosphere so that the Ni coating diffused and permeated through the steel sheet, and were temper-rolled at an elongation of 1.5% to form a corrosion-resistant coating composed of an Fe—Ni alloy layer.

C: The cold-rolled steel sheets were degreased by alkaline electrolysis, were coated with Ni in plating bath a, were annealed at about 700° C. in a 10 vol % $H_2$+90 vol % $N_2$ atmosphere so that the Ni coating diffused and permeated through the steel sheet, were temper-rolled at an elongation of 1.5%, were degreased and pickled, were coated with Sn in plating bath b, and were subjected to heat melting treatment by heating the steel sheets to the melting point of Sn or higher and holding them at that temperature. By this treatment, a corrosion-resistant coating composed of an Fe—Ni—Sn alloy layer and a Sn layer thereon was formed.

D: The cold-rolled steel sheets were degreased by alkaline electrolysis, were annealed and temper-rolled under the same conditions as process A, were coated with Sn in plating bath b, and were subjected to heat melting treatment by heating the steel sheets to the melting point of Sn or higher and holding them at that temperature. By this treatment, a corrosion-resistant coating composed of an Fe—Sn alloy layer and a Sn layer thereon was formed.

In processes C and D, the Sn coating was partially alloyed by the heat melting treatment.

The corrosion-resistant coating formed on both sides of the steel sheets was then subjected to cathode electrolysis under the cathode electrolytic treatment conditions shown in Tables 2 and 3 and was dried to form an adherent coating, thus producing surface-treated steel sheet Nos. 1 to 22 shown in Tables 2 and 3. Surface-treated steel sheet Nos. 1 to 5, 7 to 13, and 15 to 20 are examples of the present invention, whereas surface-treated steel sheet Nos. 6 and 14 are comparative examples. The phenolic resin used for the treatment bath was a phenolic resin having a weight average molecular weight of 5,000.

The coating mass of Zr of the adherent coating was determined by comparing the results of X-ray fluorescence analysis with a calibration sheet obtained in advance by chemical analysis for different Zr contents. The P content was determined by a suitable measurement method selected from X-ray fluorescence analysis, as in the measurement of the Zr content, chemical analysis, Auger electron spectroscopy, and secondary ion mass spectrometry, and the mass ratio of P to the Zr contained in the adherent coating was evaluated. In addition, the C content of the adherent coating was determined by subtracting the C content of the steel sheet, as the background, from the total carbon content measured by gas chromatography. In addition, O can be identified by surface analysis using XPS for all of Nos. 1 to 22.

In addition, an isophthalic-acid-copolymerized polyethylene terephthalate film having a draw ratio of 3.1×3.1, a thickness of 25 μm, a comonomer content of 12 mol %, and a melting point of 224° C. was laminated on both sides of surface-treated steel sheet Nos. 1 to 22 under lamination conditions where the degree of biaxial orientation (BO value) of the film became 150, specifically, the steel sheet feed rate was 40 m/min, the rubber roller nip length was 17 mm, and the time after pressing to water cooling was 1 second, thus producing laminated steel sheets Nos. 1 to 22. As used herein, the nip length refers to the length of the contact area between the rubber roller and the steel sheet in the transport direction. Laminated steel sheets Nos. 1 to 22 thus produced were evaluated for humid resin adhesion, corrosion resistance, occurrence of dot corrosion, and streak-like surface defects by the following methods.

Humid resin adhesion: The humid resin adhesion was evaluated by a 180° peel test in a retort atmosphere with a temperature of 130° C. and a relative humidity of 100%. As shown in (a) of FIG. 1, the 180° peel test was a film peel test using a test piece (size: 30 mm×100 mm, n=1 for each of the top and bottom sides, i.e., n=2 for each laminated steel sheet) prepared by cutting a portion 3 from a steel sheet 1 without cutting a film 2. As shown in (b) of FIG. 1, a weight 4 (100 g) was attached to one end of the test piece, and the test piece was folded back 180° toward the film 2 and was left standing for 30 minutes. As shown in (c) of FIG. 1, the peel length 5 was measured and evaluated, and the peel lengths (n=2) of the top and bottom sides of each laminated steel sheet were averaged. A smaller peel length 5 indicates a better humid resin adhesion, and a laminated steel sheet having a peel length 5 of less than 25 mm was evaluated to have excellent humid resin adhesion, which the present invention is intended to provide.

Corrosion resistance: The laminated surface of each laminated steel sheet was cross-cut using a cutter such that the cut reaches the steel sheet, was dipped in 80 mL of a test solution containing equal amounts of 1.5 mass % NaCl aqueous solution and 1.5 mass % citric acid aqueous solution, was left standing at 55° C. for 9 days, and was evaluated for corrosion resistance at the cut (n=1 for each of the top and bottom sides, i.e., n=2 for each laminated steel sheet) and for occurrence of dot corrosion over the entire surface of the sample as follows, where "Good" represents good corrosion resistance:

Excellent: For n=2, no corrosion occurred at the cut, and no dot corrosion occurred.

Good: For n=2, no corrosion occurred at the cut, and dot corrosion occurred partially.

Poor: For at least one of n=2, corrosion occurred at the cut, and dot corrosion occurred over the entire surface.

Streak-like surface defects: Each laminated steel sheet was visually inspected for streaks and was evaluated as follows:

Good: Few streaks were found.

Poor: Streaks were found.

The results thus obtained are shown in Table 4. The invention examples, i.e., surface-treated steel sheets Nos. 1 to 5, 7 to 13, and 15 to 20, all had excellent humid resin adhesion and corrosion resistance and no streak-like surface defects. In particular, surface-treated steel sheets Nos. 1 to 5, 8 to 13, 16 to 18, and 20, which were produced by applying a preferred pulsed current for a preferred period of time for which a current density at which no Zr precipitated was maintained and a preferred number of cycles, had peel lengths of less than 20 mm, indicating that they had more excellent humid resin adhesions. In contrast, although surface-treated steel sheet Nos. 6 and 14 had no streak-like surface defects, they had slightly poor corrosion resistance because of the occurrence of dot corrosion and also had poor humid resin adhesion. Surface-treated steel sheet Nos. 21 and 22 exhibited streak-like surface defects.

TABLE 1

| Plating bath | Bath composition |
|---|---|
| a (Ni plating bath) | Nickel sulfate: 250 g/L, nickel chloride: 45 g/L, boric acid: 30 g/L |
| b (Sn plating bath) | Stannous sulfate: 55 g/L, phenolsulfonic acid (65 mass %): 35 g/L, brightener: adequate amount |

TABLE 2

| Surface-treated steel sheet No. | Plating Process | Treatment bath Composition | Zr content (mol/L) | Total molar ratio of phosphoric acid and phenolic resin to Zr | Second current density (A/dm$^2$) | Period (sec) | Time for remaining at second current density per period (sec) |
|---|---|---|---|---|---|---|---|
| 1 | A | Potassium hexafluorozirconate 4.5 g/L + orthophosphoric acid 1 g/L | 0.016 | 0.637 | 0 | 0.04 | 0.02 |
| 2 | B | Potassium hexafluorozirconate 4.5 g/L + orthophosphoric acid 1 g/L | 0.016 | 0.637 | 0 | 0.07 | 0.04 |
| 3 | C | Potassium hexafluorozirconate 4.5 g/L + orthophosphoric acid 1 g/L | 0.016 | 0.637 | 0 | 0.04 | 0.02 |
| 4 | D | Potassium hexafluorozirconate 6.2 g/L + orthophosphoric acid 1 g/L | 0.022 | 0.466 | 0 | 0.04 | 0.02 |
| 5 | D | Potassium hexafluorozirconate 12.5 g/L + orthophosphoric acid 1 g/L | 0.044 | 0.231 | 0 | 0.05 | 0.03 |
| 6 | A | Potassium hexafluorozirconate 4.5 g/L | 0.016 | 0.000 | 0 | 0.04 | 0.02 |
| 7 | A | Potassium hexafluorozirconate 4.5 g/L + orthophosphoric acid 1 g/L | 0.016 | 0.637 | 0 | 0.7 | 0.4 |
| 8 | A | Potassium hexafluorozirconate 6.2 g/L + orthophosphoric acid 1 g/L + phenolic resin 0.9 g/L | 0.022 | 0.474 | 0 | 0.1 | 0.05 |
| 9 | A | Potassium hexafluorozirconate 12.5 g/L + orthophosphoric acid 1 g/L + phenolic resin 0.9 g/L | 0.044 | 0.235 | 0 | 0.05 | 0.03 |
| 10 | B | Potassium hexafluorozirconate 4.5 g/L + orthophosphoric acid 1 g/L + phenolic resin 0.5 g/L | 0.016 | 0.648 | 0 | 0.1 | 0.05 |
| 11 | C | Potassium hexafluorozirconate 6.2 g/L + orthophosphoric acid 1 g/L + phenolic resin 0.9 g/L | 0.022 | 0.474 | 0 | 0.04 | 0.02 |
| 12 | D | Potassium hexafluorozirconate 12.5 g/L + orthophosphoric acid 1 g/L + phenolic resin 0.5 g/L | 0.044 | 0.233 | 0 | 0.05 | 0.02 |
| 13 | D | Potassium hexafluorozirconate 12.5 g/L + orthophosphoric acid 1 g/L + phenolic resin 0.9 g/L | 0.044 | 0.235 | 0 | 0.1 | 0.05 |
| 14 | D | Potassium hexafluorozirconate 12.5 g/L | 0.044 | 0.000 | 0 | 0.05 | 0.02 |
| 15 | D | Potassium hexafluorozirconate 12.5 g/L + orthophosphoric acid 1 g/L + phenolic resin 0.9 g/L | 0.044 | 0.235 | 0 | 0.8 | 0.5 |
| 16 | A | Potassium hexafluorozirconate 4.4 g/L + orthophosphoric acid 1.2 g/L + tannnic acid 1 g/L | 0.016 | 0.800 | 0 | 0.05 | 0.02 |
| 17 | C | Potassium hexafluorozirconate 4.4 g/L + orthophosphoric acid 1.2 g/L + tannnic acid 1 g/L | 0.016 | 0.800 | 0 | 0.05 | 0.02 |
| 18 | D | Potassium hexafluorozirconate 4.4 g/L + orthophosphoric acid 1.2 g/L + tannnic acid 1 g/L | 0.016 | 0.800 | 0 | 0.05 | 0.02 |
| 19 | D | Potassium hexafluorozirconate 4.4 g/L + orthophosphoric acid 1.2 g/L + tannnic acid 1 g/L | 0.016 | 0.800 | 0 | 0.8 | 0.5 |
| 20 | A | Potassium hexafluorozirconate 4.5 g/L + phenolic resin 0.9 g/L | 0.016 | 0.800 | 0 | 0.05 | 0.02 |

| Surface-treated steel sheet No. | Number of cycles (cycles) | Total charge density at first current density (C/dm$^2$) | Coating masses of Ni and Sn (mg/m$^2$) Ni | Coating masses of Ni and Sn (mg/m$^2$) Sn | Coating mass of Zr (mg/m$^2$) | Mass ratio P/Zr | Mass ratio C/Zr | Remarks |
|---|---|---|---|---|---|---|---|---|
| 1 | 25 | 0.5 | 300 | — | 8 | 1.4 | — | Invention example |
| 2 | 20 | 1.8 | 70 | — | 8 | 0.5 | — | Invention example |
| 3 | 25 | 3.0 | 70 | 700 | 30 | 0.4 | — | Invention example |
| 4 | 25 | 0.5 | — | 500 | 8 | 0.5 | — | Invention example |
| 5 | 20 | 3.0 | — | 800 | 30 | 0.4 | — | Invention example |
| 6 | 25 | 0.5 | 300 | — | 8 | — | — | Comparative example |
| 7 | 4 | 1.0 | 300 | — | 8 | 0.5 | — | Invention example |
| 8 | 15 | 0.5 | 300 | — | 8 | 0.5 | 0.4 | Invention example |
| 9 | 20 | 4.0 | 300 | — | 30 | 0.4 | 0.2 | Invention example |
| 10 | 15 | 1.8 | 70 | — | 8 | 0.5 | 0.5 | Invention example |
| 11 | 25 | 0.5 | 70 | 700 | 8 | 0.5 | 0.5 | Invention example |
| 12 | 25 | 1.8 | — | 500 | 30 | 0.1 | 0.1 | Invention example |
| 13 | 15 | 1.8 | — | 800 | 8 | 0.5 | 0.5 | Invention example |

TABLE 2-continued

| | | | | | | | | |
|---|---|---|---|---|---|---|---|---|
| 14 | 25 | 2.0 | — | 500 | 30 | — | — | Comparative example |
| 15 | 4 | 4.0 | — | 800 | 30 | 0.2 | 0.1 | Invention example |
| 16 | 20 | 1.8 | 300 | — | 8 | 0.5 | 0.5 | Invention example |
| 17 | 20 | 1.8 | 70 | 700 | 8 | 0.5 | 0.4 | Invention example |
| 18 | 20 | 1.8 | — | 500 | 8 | 0.5 | 0.4 | Invention example |
| 19 | 4 | 1.8 | — | 500 | 8 | 0.5 | 0.4 | Invention example |
| 20 | 20 | 1.8 | 300 | — | 30 | 0.2 | 0.1 | Invention example |

First current density: current density at which Zr precipitates;
second current density: current density at which no Zr precipitates

TABLE 3

| Surface-treated steel sheet No. | Plating Process | Treatment bath Composition and pH | Zr content (mol/L) | Molar ratio of metal M to Zr (Ti) | Second current density (A/dm$^2$) | Period (sec) | Time for Remaining at second current density per period (sec) | Number of cycles (cycles) | Total charge density at first current density (C/dm$^2$) | Coating masses of Ni and Sn (mg/m$^2$) Ni | Coating masses of Ni and Sn (mg/m$^2$) Sn | Coating mass of Zr (mg/m$^2$) | Added element M | Mass ratio metal ion M/Zr | Remarks |
|---|---|---|---|---|---|---|---|---|---|---|---|---|---|---|---|
| 21 | C | Porassium fluorotitanate 10.6 g/L + vanadium chloride 5 g/L pH 3.5 | 0.044 | 0.931 | 0 | 0.9 | 0.40 | 4 | 12.0 | 70 | 700 | 20 | V | 0.15 | Comparative example |
| 22 | D | Porassium fluorotitanate 10.6 g/L + manganese sulfate pentahydrate 5 g/L pH 3.5 | 0.044 | 0.531 | 0 | 0.9 | 0.40 | 4 | 12.0 | 0 | 500 | 20 | Mn | 0.10 | Comparative exammple |

TABLE 4

| Laminated steel sheet No. | Humid resin adhesion Peel length (mm) | Corrosion resistance | Streak-like surface defects | Remarks |
|---|---|---|---|---|
| 1 | 18 | Excellent | Good | Invention example |
| 2 | 18 | Excellent | Good | Invention example |
| 3 | 19 | Excellent | Good | Invention example |
| 4 | 18 | Excellent | Good | Invention example |
| 5 | 19 | Good | Good | Invention example |
| 6 | 50 | Poor | Good | Comparative example |
| 7 | 24 | Excellent | Good | Invention example |
| 8 | 17 | Excellent | Good | Invention example |
| 9 | 18 | Excellent | Good | Invention example |
| 10 | 12 | Excellent | Good | Invention example |
| 11 | 19 | Excellent | Good | Invention example |
| 12 | 17 | Excellent | Good | Invention example |
| 13 | 19 | Excellent | Good | Invention example |
| 14 | 50 | Poor | Good | Comparative example |
| 15 | 24 | Good | Good | Invention example |
| 16 | 17 | Excellent | Good | Invention example |
| 17 | 19 | Excellent | Good | Invention example |
| 18 | 17 | Excellent | Good | Invention example |
| 19 | 24 | Good | Good | Invention example |
| 20 | 18 | Excellent | Good | Invention example |
| 21 | 8 | Good | Poor | Comparative example |
| 22 | 9 | Good | Poor | Comparative example |

REFERENCE SIGNS LIST

1 steel sheet
2 film
3 cut portion of steel sheet
4 weight
5 peel length

The invention claimed is:

1. A method for manufacturing a surface-treated steel sheet, comprising forming a corrosion-resistant coating comprising at least one layer selected from a Ni layer, a Sn layer, an Fe—Ni alloy layer, an Fe—Sn alloy layer, and an Fe—Ni—Sn alloy layer on at least one side of a steel sheet; and forming an adherent coating by cathode electrolytic treatment in an aqueous solution containing Zr in a concentration of 0.008 to 0.07 mol/L (L: liter) and at least one species selected from phosphoric acids and phenolic resins in a total molar ratio to Zr of 0.01 to 10 under electrolysis conditions where a current is used that varies between a current density at which Zr precipitates and a current density at which no Zr precipitates at a period of 0.01 to 0.4 second and that remains within a current density range where no Zr precipitates for 0.02 to 0.05 seconds per period, and the number of cycles is 10 or more, wherein the upper limit of the current density range where no Zr precipitates depends on the composition and pH of the aqueous solution used for the cathode electrolytic treatment.

2. The method for manufacturing a surface-treated steel sheet according to claim 1, wherein the current density at which no Zr precipitates is 0 A/dm$^2$.

* * * * *